Nov. 8, 1949  F. L. FULKE  2,487,232

LUBRICATED MINING MACHINE CHAIN

Filed Jan. 17, 1946

INVENTOR.
Frank L. Fulke,
BY
Hood & Hahn
ATTORNEYS.

Patented Nov. 8, 1949

2,487,232

UNITED STATES PATENT OFFICE 2,487,232

LUBRICATED MINING MACHINE CHAIN

Frank L. Fulke, Terre Haute, Ind.

Application January 17, 1946, Serial No. 641,800

10 Claims. (Cl. 74—257)

The primary object of the present invention is to provide for permanent and continuous lubrication of all the joints of a coal cutting chain, while providing also an improved chain joint with novel means for locking the journal pins in position, the joint and lubricating means being of such character that features of each contribute to the success of the other. A further object of the invention is to provide means for confining and activating the lubricant in the chain. A further object of the invention is to provide means whereby any lubricant carrying link may be readily connected or disconnected in the chain, at the machine, and without the use of powerful tools.

Further objects of the invention will appear as the description proceeds.

The obstacles to successful continuous lubrication of a coal cutting chain are such that until now they have appeared insurmountable, even to the applicant, who has thought of the problem for many years. A principal obstacle lies in the fact that a cutter chain produces a thick cloud of smoky coal dust, in which it must operate as it cuts into and under the coal. It has not been possible to seal a cutter chain joint so completely as to prohibit entry of this fine dust to the frictioning surfaces; at least it would not be possible after the slightest wear of the joint had occurred. Another great obstacle is the fact that in any form of lubricant magazine, any sort of flowing lubricant will escape, especially after joint wear occurs, while an inert lubricant will not move to the friction surfaces where it is needed.

All methods of continuous joint lubrication of a cutter chain of which the applicant has been able to think involve some sort of lubricant pocket or maganzine. Coal dust getting into any such pocket will mix with any sort of oil or grease therein to form a paste which will soon become substantially solid and inert, so that it cannot move to engage a bearing surface.

In my present invention, I have found the solution to all the problems involved by devising means in the magazine to impel solid masses of lubricant into direct lubricating engagement with the journal bearings. A fibrous grease such as is used for packing automobile wheel bearings is a solid mass, inert and non-flowing under any conditions encountered in my problem, incapable of escaping from a lubricant magazine even when joints are badly worn; and by means which I have devised, successive increments of such grease will be impelled to move against the non-pulling sides of the joint pins and, by the swiveling action of the joint, this grease will be caused to spread itself around the frictioning areas where continuous lubrication is desired.

The accomplishment of my objectives encounters some serious problems, the solutions of which involve novel construction and departure from usual practices.

For one thing, anyone thinking of lubricating a journal pin with a solid lubricant would consider it necessary that such lubricant directly engage the actual frictioning surface—that is, the side of the journal pin actually in contact with the eye of the adjacent link. Such an application would be a solid annular bushing of hard lubricant such as compressed powdered graphite pressed into the eye of the link. This is quite conventional in other types of chains, as are inserts of such solid lubricant fitted into the pulling side of the link eye so that the journal pin will engage the lubricating insert. But in a mining machine cutter chain such forms will not serve because of the very high pressure at its joints, especially when the racing chain fouls a boulder or sulphur ball. This produces a shock load of such intensity as to sometimes break a chain otherwise able to withstand a hundred thousand pounds tensile pull. Such shock pressures would crack up and disintegrate any such forms of lubricant placed at the pressure side of the joints in a cutter chain.

According to my invention, I provide a supply of the above-mentioned fibrous lubricant at the non-pulling side of the cutter chain joint. In doing this, of course, means must be found to insure the continuous engagement of the lubricant with the journal surface. In other words, the body of solid lubricant must be made to move against the journal from the non-pressure side, since the journal cannot press against the body of lubricant at the pressure side. Then, if that is accomplished, increments of the lubricant will be continuously wiped around the bearing surfaces as the flexures of the joints continue.

In my co-pending application Serial No. 489,604, filed June 4, 1943, now Patent No. 2,400,230, dated May 14, 1946, I dispose solid masses of lubricant in a pocket formed in an internal connector link. But in that application, my lubricant mass is relatively static, without mechanical means to impel it to move to the bearings and circulate its own mass, and my improvement over that will be obvious. I have also contrived very convenient means, comprising a steel plate of novel outline, to serve the triple purpose of sealing in my lubricant, sealing out coal dust, and securely locking my links together against displacement of any part of the chain. The convenience of this may be realized when it is considered that other cutter chains employ as journal pins heavy rivets, or rods that must be bent, entailing sending to the underground mine shop for a repairman in case the chain breaks. The machine operator may easily repair my chain himself without the long delay of sending for a repairman.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
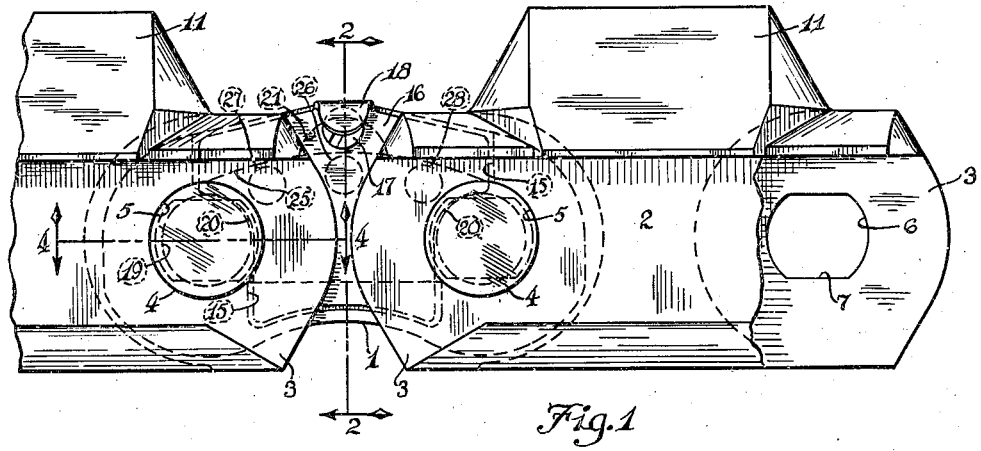
Fig. 1 is a top plan view of my lubricant carrying link associated with a pair of adjacent bit links, one of which is shown fragmentally.
Figure 2:
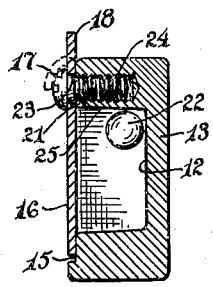
Fig. 2 is a transverse section taken substantially on the line 2—2 of Fig. 1.

Each bit link 2 is formed with a head 11 for carrying some form of coal cutting bit. At its opposite ends, each bit link 2 has spaced parallel arms 3 which are perforated to hold journal pins 4 non-rotatively, so that upon these journal pins 4 the lubricant carrying link 1 may swivel. The sides and bases of links 2 are closely fitted between, and supported by, guideway surfaces of the mining machine cutter bar in accordance with standard practice. The journal pins 4 are sized to fit apertures 5 and 6 formed in the spaced arms 3 of the bit link 2. The apertures 5 in the upper arms are larger than the apertures 6 in the lower arms. Apertures 6 are broached out of round, as at 7. The lower end 8 of journal pin 4 is correspondingly formed smaller than its upper end, whereby there is defined a shoulder 9; and this small end 8 of the journal pin is flattened to cooperate with the flattened part 7 of its aperture 6. In this way, the journal pins 4 are held against rotation relative to the links 2; and the shoulder 9 bears against the inside wall of the lower arm 3 to act as an effective seal against loss of lubricant or admission of coal dust into the bearing.

In the upper side of link 1 there is formed a large lubricant magazine 12, so that only a thin floor 13 is defined at the lower side of link 1; and this magazine extends lengthwise of link 1 to overlap completely and encompass the bores 14 which swivel upon the journal pins 4. It will be seen that, because of this construction, the lubricant in the magazine 12 may directly engage the journal pins 4 throughout the length of their bearing area upon the link 1, except for the minor portion passing through floor 13.

In the upper side of link 1, a shallow indentation 15 is formed, external of the boundary of lubricant magazine 12; and lying in this indentation 15 is a steel plate 16 which may be slidably introduced into, or removed from, indentation 15 after the links are connected together, said plate sliding between the floor of said indentation 15 and the adjacent surfaces of the arms 3 of the bit carrying links with which the link 1 is associated. After such plate 16 has been so located, it may be secured in place by a screw 17, after which the tab 18, formed on the plate 16, may be bent over the head of the screw 17 to prevent accidental dislodgment of said screw.

When the plate 16 is in position, it tightly seals the open side of magazine 12 to prevent loss of lubricant and to prevent access of coal dust to the magazine.

Since journal pins 4 are non-rotatably locked in the arms 3 of the bit links 2, it remains necessary only to secure these pins 4 against axial movement in the arms 3, such as might occur as a result of vibration and chattering during operation of the chain. For this purpose, annular grooves 19 are formed in the pins 4, and plate 16 takes into these grooves 19 when it is inserted, plate 16 being, at its opposite ends, part circular as at 20. The part circular portions 20 are of a radius substantially corresponding to that of the floors of the grooves 19. The outer parts of these portions 20 of each plate 16 extend laterally past the centers of the pins 4 so that when the chain stretches through wear, these outer parts of portions 20 will still fully mesh into grooves 19 of the pins 4 and prevent any axial movement of the pins.

A further indentation 21 is disposed in the upper side of link 1. To couple the chain and permanently pack all the lubricant magazines at the factory, the link 1 is first inserted between the spaced arms 3 of the two adjacent bit links 2, and the apertures 5 and 6 in the arms 3 are lined up with the bores 14 of the link 1. Then, from above, the two journal pins 4 are inserted until their shoulders 9 engage the inside walls of lower arms 3. Then, into the still open lubricant magazine 12 is dropped a lead ball 22. Plate 16 is now inserted and pushed in until its fastening screw hole 23 lines up with the tapped hole 24 in link 1. It will then have fully meshed its circular end portions 20 into the grooves 19 of the two journal pins. Now, before inserting screw 17, the nose of a high pressure gun full of lubricant is pressed against the screw hole 23 in plate 16, and indentation 21 will lead lubricant under pressure to fill the magazine 12 completely, a small amount of grease being emitted between the edges of plate 16 and the edges of indentation 15 to remain as a seal against coal dust trying to enter the magazine. The meshed relation between plate 16 and journal pin grooves 19 also aids in this objective, it being understood that this solid lubricant under pressure thoroughly fills all interstices. Screw 17 is then inserted and turned down tightly, whereby the plate 16 is pressed tightly against the floor of the indentation 15 to prevent the entry of dust into the magazine 12. Now, the tab 18 of plate 16 may be bent over to protect and secure the screw. The same procedure is followed for all the links until the chain is assembled fully and permanently packed with lubricant.

Figure 3:
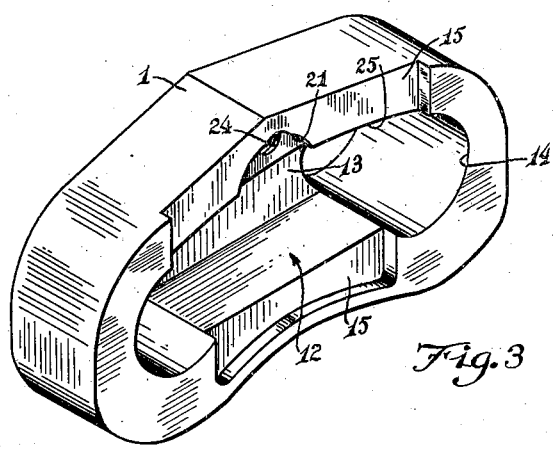
Fig. 3 is a perspective view of my connecting link.
Figure 4:
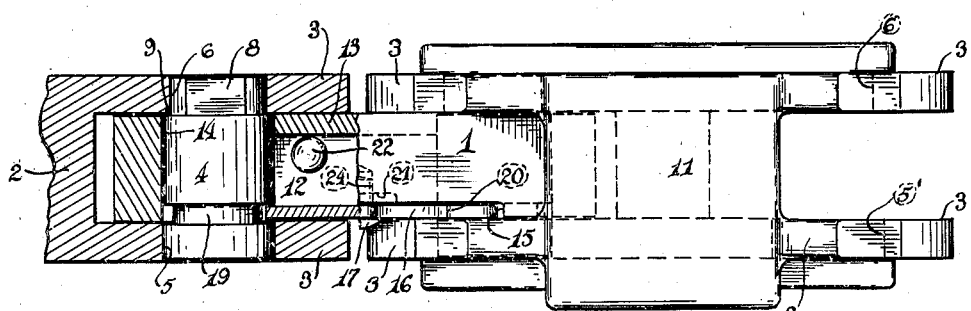
Fig. 4 is a side elevation, taken from the outer edge of the chain, parts of the assembly being shown in section upon the line 4—4 of Fig. 1.

The lead ball 22 will move about in the magazine 12 under the influence of forces arising during coal cutting. The outer wall 25 of the magazine 12 is curvilinear, as will be seen from an inspection of Figs. 1 and 3. When the link 1 whips around a 6 inch radius at the end of a standard cutter bar, the ball will certainly seek to move to the position indicated by the reference numeral 26 in Fig. 1, under the influence of centrifugal force. When shock cutting loads are encountered, momentum will tend to move the ball toward the position indicated by the reference numeral 27. Whenever the clutch is dropped in to start the chain, it always jumps the chain forward, whereupon the inertia of the ball will tend to move the ball toward the position indicated by the reference numeral 28. Whenever the ball 22 moves in either direction along the curvilinear wall 25, it will displace lubricant. And when link 1 whips around the end of the cutter bar, this displaced lubricant will be replaced by centrifugal force. This means that positive circulation of all the lubricant throughout the magazine is assured, and that fresh increments will be impelled against the journal pins, so that this fresh grease may be whipped around each pin by the swiveling action. Otherwise, even with the careful sealing devised, slight increments of coal dust entering through the journal clearance might in time, if the grease in contact with the journal pins were static, so contaminate it as to form a hard shell that would thereafter prevent adequate lubrication of the journals.

I claim as my invention:

1. In a chain, a link formed at its opposite ends with perforations to swivel upon a pair of journal pins locked non-rotatively in adjacent links, an indentation in one side of said link communicating with both its said perforations, annular grooves in said journal pins, a solid lubricant in said indentation impelled to engage the non-pulling sides of said pair of journal pins, and means to seal said indentation and to lock said journal pins against axial movement comprising an element slidable upon said link to simultaneously close said indentation and mesh into said annular grooves of both said journal pins.

2. In a chain, a link formed at its opposite ends with perforations to swivel upon a pair of journal pins locked non-rotatively in adjacent links, said journal pins being provided with annular indentations, said perforated link being indented at one side to define a lubricant pocket extending longitudinally of said link to overlap said perforations, a body of solid lubricant in said pocket engaging said journal pins at their non-pressure sides, and means to confine said body of lubricant in said pocket and to lock said journal pins against axial movement comprising a single element movable upon a side of said indented link in a plane at right angles to the axes of said journal pins into mesh with said indentations of both said journal pins.

3. In a chain, a central link formed at its opposite ends with perforations to swivel upon a pair of journal pins non-rotatively locked in spaced arms of adjacent links, said arms of both said adjacent links overlapping both sides of said central link, said journal pins being provided with annular grooves, said central link being indented at one side to define a lubricant pocket extending longitudinally of said central link to communicate with both its said end perforations, a solid mass of lubricant in said pocket engaging the non-pressure sides of both said journal pins, and means to seal said pocket and to lock said journal pins against axial movement comprising a flat plate carried by said central link and movable between the face of said central link and said overlapping arms of adjacent links into mesh with the annular grooves in both said journal pins.

4. In a coal cutting chain operable in a guideway embracing the back and both sides of the chain, bit carrying links bifurcated to define at each end of each of said links a pair of spaced arms, journal pins supported in aligned perforations in said arms, a connecting link formed at each end with a perforation to journal upon one of said journal pins and sized to fit between said spaced arms, a lubricant cavity central of said connecting link overlapping said perforations at each end thereof, means to seal solid lubricant bodies in said cavity and to lock said journal pins against axial movement, comprising an element movable between a surface of said connecting link and an inside face of one of said spaced arms, and means to lock said sealing and locking means against displacement from said connecting link.

5. In a coal cutting chain operable in a guideway supporting the back and both lateral surfaces of the chain, a bit carrying link bifurcated to define spaced arms, a journal pin in aligned apertures in said arms, a connecting link fitting between said spaced arms and perforated for said journal pin, said journal pin being provided with an annular groove, locking means movable in a plane inside one of said spaced arms at right angles to the axis of said journal pin into cooperative engagement with said annular groove for locking said journal pin against axial displacement, and means for locking said locking means upon the chain.

6. In a chain, a link formed at its opposite ends with perforations to swivel upon a pair of journal pins locked non-rotatively in adjacent links, said journal pins being provided with annular grooves, means to secure said journal pins against axial movement comprising a plate movable upon a side of said perforated link and detachably secured thereto, said plate extending longitudinally of said perforated link so that its end edges overlap both said perforations, each said overlapping end edge of said plate being part circular with a radius less than the radius of said journal pins and meshing into said annular groove of one of said journal pins.

7. In a coal cutting chain, a link having a lubricant magazine opening through a surface thereof, a second link, means pivotally connecting said links, and an element removably associated with said surface to seal the lubricant in the magazine, seal coal dust out of the magazine, and engaging said connecting means to lock said first named link to said second link.

8. As an article of manufacture, a chain link having journal bores adjacent each end and having a recess in its side, and a locking element detachably fastened to said link, lying in said recess, and projecting lengthwise of said link to partially overlap said journal bores.

9. In combination, a pair of chain links, each bifurcated at one end, an intermediate link having its opposite ends received between the furcations of said first-named links, respectively, the furcations of each of said first-named links being apertured and said intermediate link being formed with apertures at its opposite ends registering with the apertures of said first-named links, respectively, said intermediate link formed with a cavity opening through its upper surface and encompassing said intermediate link apertures, journal pins entered in said registering apertures, means holding said pins against rotation relative to said first-named links, and a plate slidably mounted between said upper surface of said intermediate link and the adjacent furcations of said first-named links, said plate closing said cavity and engaging said pins to hold the latter against axial movement relative to said intermediate link.

10. In combination, a chain link having an end bifurcated to define spaced arms, a further link having an end receivable between said arms, said spaced arms being provided with aligned apertures and said further link being provided with a bore registering with the apertures of said arms, a connecting pin supported in the apertures of said spaced arms and passing through the bore of said further link, and means for locking said connecting pin against movement in the apertures of said spaced arms comprising an element insertable between a side of said further link and the inside wall of the adjacent one of said spaced arms and movable to partially overlap said bore.

FRANK L. FULKE.

REFERENCES CITED

The following references are of record in the file of this patent:

UNITED STATES PATENTS

| Number | Name | Date |
|---|---|---|
| 364,511 | Hardsocg | June 7, 1887 |
| 472,563 | Sykes | Apr. 12, 1892 |
| 811,391 | Gates | Jan. 30, 1906 |
| 1,429,518 | McMahon | Sept. 19, 1922 |
| 2,400,230 | Fulke | May 14, 1946 |

FOREIGN PATENTS

| Number | Country | Date |
|---|---|---|
| 27,253 | Great Britain | Dec. 1, 1896 |
| 242,543 | Great Britain | Nov. 12, 1925 |